United States Patent
Lee et al.

(10) Patent No.: US 7,930,250 B2
(45) Date of Patent: Apr. 19, 2011

(54) METHOD FOR MANAGING USER DOMAIN IN DIGITAL RIGHTS MANAGEMENT AND SYSTEM THEREOF

(75) Inventors: Seung-Jae Lee, Seoul (KR); Te-Hyun Kim, Gyeonggi-Do (KR); Youn-Sung Chu, Seoul (KR); Kiran Kumar Keshavamurthy, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 11/760,571

(22) Filed: Jun. 8, 2007

(65) Prior Publication Data

US 2008/0010209 A1 Jan. 10, 2008

(30) Foreign Application Priority Data

Jun. 9, 2006 (KR) .................. 10-2006-0052208

(51) Int. Cl.
*G06F 21/00* (2006.01)

(52) U.S. Cl. .............. 705/51; 705/50; 705/59; 709/223; 709/226; 709/229; 709/224; 726/5

(58) Field of Classification Search .................. 705/51, 705/59; 709/223, 224, 225, 229
See application file for complete search history.

(56) References Cited

U.S. PATENT DOCUMENTS

| | | | | |
|---|---|---|---|---|
| 6,865,555 B2 * | 3/2005 | Novak | .............................. | 705/59 |
| 7,188,224 B2 * | 3/2007 | Ohta et al. | ..................... | 711/163 |
| 7,191,343 B2 * | 3/2007 | Tuoriniemi et al. | .......... | 713/193 |
| 7,437,771 B2 * | 10/2008 | Alkove et al. | ................... | 726/29 |
| 7,444,388 B1 * | 10/2008 | Svendsen | ....................... | 709/217 |
| 7,487,363 B2 * | 2/2009 | Alve et al. | ...................... | 713/193 |
| 7,512,987 B2 * | 3/2009 | Williams | ........................ | 726/27 |
| 7,526,451 B2 * | 4/2009 | Park et al. | ....................... | 705/51 |
| 7,613,782 B2 * | 11/2009 | Nakajima et al. | ............. | 709/206 |
| 7,619,999 B2 * | 11/2009 | DaCosta | ....................... | 370/312 |
| 7,620,713 B2 * | 11/2009 | Tokuhashi et al. | ............ | 709/224 |
| 7,627,903 B2 * | 12/2009 | Kamperman et al. | .......... | 726/27 |
| 7,685,643 B2 * | 3/2010 | Lee et al. | ........................ | 726/27 |
| 2002/0107806 A1 * | 8/2002 | Higashi et al. | .................. | 705/51 |
| 2002/0147686 A1 * | 10/2002 | Safadi et al. | .................... | 705/51 |
| 2002/0157002 A1 * | 10/2002 | Messerges et al. | ........... | 713/155 |
| 2002/0174354 A1 * | 11/2002 | Bel et al. | ........................ | 713/193 |
| 2003/0018491 A1 * | 1/2003 | Nakahara et al. | ................. | 705/1 |
| 2004/0078338 A1 * | 4/2004 | Ohta et al. | ...................... | 705/51 |
| 2004/0103303 A1 * | 5/2004 | Yamauchi et al. | ............ | 713/200 |
| 2004/0103312 A1 | 5/2004 | Messerges et al. | | |
| 2004/0215735 A1 * | 10/2004 | Nakahara et al. | ............. | 709/207 |
| 2005/0044397 A1 * | 2/2005 | Bjorkengren | ................. | 713/200 |
| 2005/0091507 A1 * | 4/2005 | Lee et al. | ....................... | 713/182 |
| 2005/0172127 A1 * | 8/2005 | Hartung et al. | ............... | 713/167 |

(Continued)

FOREIGN PATENT DOCUMENTS

CN 1794128 A 6/2006

(Continued)

*Primary Examiner* — Andrew J. Fischer
*Assistant Examiner* — Mamon Obeid
(74) *Attorney, Agent, or Firm* — Birch, Stewart, Kolasch & Birch, LLP

(57) ABSTRACT

A method for managing a specific domain (or user domain), for example leaving the domain by a specific device after fully returning a Rights Object (RO) taken by the specific device, instead of deactivating the RO, when leaving the specific domain, the method in which the device desiring to leave the specific domain moves its RO to another device desiring to join the specific domain and thereafter leaves the specific domain under the control of a Domain Authority/Domain Enforcement Agent (DA/DEA).

7 Claims, 7 Drawing Sheets

U.S. PATENT DOCUMENTS

| | | | |
|---|---|---|---|
| 2005/0182727 A1* | 8/2005 | Robert et al. | 705/51 |
| 2005/0210261 A1* | 9/2005 | Kamperman et al. | 713/182 |
| 2005/0216763 A1* | 9/2005 | Lee et al. | 713/200 |
| 2006/0031438 A1* | 2/2006 | Tokuhashi et al. | 709/223 |
| 2006/0041511 A1* | 2/2006 | Ahn | 705/51 |
| 2006/0190621 A1* | 8/2006 | Kamperman et al. | 709/245 |
| 2006/0282391 A1* | 12/2006 | Peterka et al. | 705/57 |
| 2007/0079381 A1* | 4/2007 | Hartung et al. | 726/26 |
| 2007/0136205 A1* | 6/2007 | Przybilla | 705/54 |
| 2007/0156599 A1* | 7/2007 | Yoon et al. | 705/52 |
| 2007/0199075 A1* | 8/2007 | Skoric et al. | 726/27 |
| 2007/0203838 A1* | 8/2007 | Lee et al. | 705/51 |
| 2007/0234432 A1* | 10/2007 | Korkishko et al. | 726/27 |
| 2007/0250617 A1* | 10/2007 | Kim et al. | 709/223 |
| 2007/0265932 A1* | 11/2007 | Im et al. | 705/26 |
| 2008/0010209 A1* | 1/2008 | Lee et al. | 705/59 |
| 2008/0046758 A1* | 2/2008 | Cha et al. | 713/189 |
| 2008/0201376 A1* | 8/2008 | Khedouri et al. | 707/104.1 |
| 2008/0256646 A1* | 10/2008 | Strom et al. | 726/29 |
| 2009/0150666 A1* | 6/2009 | Sakakihara et al. | 713/158 |
| 2009/0217036 A1* | 8/2009 | Irwin et al. | 713/168 |
| 2009/0228982 A1* | 9/2009 | Kobayashi | 726/26 |
| 2010/0017888 A1* | 1/2010 | Zhang et al. | 726/26 |
| 2010/0023491 A1* | 1/2010 | Huang et al. | 707/3 |

FOREIGN PATENT DOCUMENTS

| | | |
|---|---|---|
| JP | 2002-329026 | 11/2002 |
| JP | 2004-535623 A | 11/2004 |
| KR | 10-2005-0101940 A | 10/2005 |
| KR | 10-2006-0117769 A | 11/2006 |
| WO | WO-2004/059451 A1 | 7/2004 |

* cited by examiner

METHOD FOR MANAGING USER DOMAIN IN DIGITAL RIGHTS MANAGEMENT AND SYSTEM THEREOF

TECHNICAL FIELD

The present invention relates to a Digital Rights Management (DRM), and more particularly, to a method and system for managing (e.g. leaving) a domain (or user domain) in a DRM.

BACKGROUND ART

Generally, a digital rights management (DRM) is technique to protect a rights object (RO) for digital contents and systematically manage it, and provides a protecting and managing scheme for preventing an illegal copy of the contents, obtaining the RO, generating/moving the contents, and consuming the RO and the contents.

FIG. 1 is a configuration view showing a DRM system in accordance with the related art.

As shown, the DRM system controls contents issued to a user by a contents provider to be consumed only in a right-limit of RO. The contents provider is an entity corresponding to a Contents Issuer (CI) and/or a Rights Issuer (RI).

The CI issues contents protected by a specific encryption method (hereinafter, will be referred to as DRM contents) so as to protect contents from a user having no access right, and the RI issues a Rights Object (RO) necessary to consume the DRM contents.

A DRM agent is mounted at a device thus to receive the DRM contents and RO from the CI or the RI, and controls a consumption of the DRM contents at a corresponding device by analyzing a 'License' contained in the RO. The License consists of a 'Permission' and a 'Constraint'.

In the related art DRM system, the RI has managed a certain domain. That is, the RI was able to add or delete a specific device to/from the certain domain. In the domain management method of the related art, as only one RO is issued to a certain domain, all devices in the certain domain can use the RO by copying and installing the RO each other. Therefore, the related art allows all devices in the certain domain to use evenly the RO.

However, since the related art has not defined any procedure corresponding to a case where an RO issued to a specific device is sent (moved or transferred) to second and third devices, a user's request for keeping on using the RO by sending the RO to any device although the specific device leaves a domain has not been appropriately treated and utilities of the DRM system and digital contents have been degraded accordingly.

DISCLOSURE OF THE INVENTION

Therefore, it is an aspect of the present invention to provide a method and device for leaving a domain (or a user domain) by a device after fully returning a Rights Object (RO) taken by the device when leaving the user domain.

To achieve this aspect, there is provided a method for managing a domain in a Digital Rights Management (DRM) comprising: sending, by a first device, a first message to a second device to request for leaving a domain; moving, by a first device, a domain Rights Object (RO) to a target device; and receiving, by the first device, a second message notifying the successful leaving from the domain from the second device.

Preferably, the sending of the first message may comprise receiving, by the first device, a trigger message indicating the leaving from the domain from the second device.

Preferably, the method may further comprise joining, by the target device, the domain in case where the target device is not the second device.

Preferably, the joining to the domain may comprise: sending, by the target device, a message to the second device to request for joining the domain; and receiving, by the target device, a response message with respect to the domain join request from the second device.

In another aspect of the present invention, there is provided a method for managing a domain in a Digital Rights Management (DRM) comprising: sending, by a first device, a first message to a second device to request for the leaving from a domain; receiving, by the first device, information related to a target device to which a domain RO is to be moved from the second device; moving, by the first device, the domain RO to the target device based upon the information; and receiving, by the first device, a second message indicating the leaving from the domain from the second device.

Preferably, the method may further comprise joining, by the target device, the domain in case where the target device has not joined the domain.

Preferably, the joining to the domain may comprise: sending, by the target device, a message for a domain join request to the second device; and receiving, by the target device, a response message with respect to the domain join request from the second device.

In another aspect of the present invention, there is provided a method for managing a domain in a Digital Rights Management (DRM) comprising: receiving, by a second device, a domain request message from a first device; sending, by the second device, a trigger message to move a domain RO to the first device; and allowing, by the second device, the first device to separate from the domain.

Preferably, the method may further comprise sending, by the second device, a message to the first device to indicate the separating of the first device from the domain.

Preferably, the method may further comprise providing, by the second device, the first device with information related to the target device to which the domain RO is to be moved.

Preferably, the method may further comprise allowing, by the second device, a third device to join the domain.

Preferably, the allowing the third device to join the domain may comprise: receiving, by the second device, a domain join request message from the third device; and sending, by the second device, a domain join response message to the third device.

In another aspect of the present invention, there is provided a method for leaving a domain in a Digital Rights Management (DRM) comprising: leaving, by a first device, a domain managed by a second device; and joining, by a third device, the domain as the first device leaves the domain.

Preferably, the method may further comprise moving, by the first device, part or all of domain ROs used in the domain to the third device.

In accordance with the present invention, there is provided a terminal comprising: a transmitter which sends a domain leave request message ; a receiver which receives a trigger message for moving a domain Rights Object (RO) from a Domain Authority/Domain Enforcement Agent (DA/DEA), receives a message indicating a domain leave and receives information related to a target device provided by the DA/DEA; and a controller which selects the target device to move a domain RO thereto based upon the received information related to the target device, and moves the domain RO to the target device.

Preferably, the terminal may further comprise: a memory which stores the received information related to the target device; an output unit which displays the information; and an input unit which selects a specific target device from a list of target devices displayed on the output unit.

MODES FOR CARRYING OUT THE PREFERRED EMBODIMENTS

Figure 1:
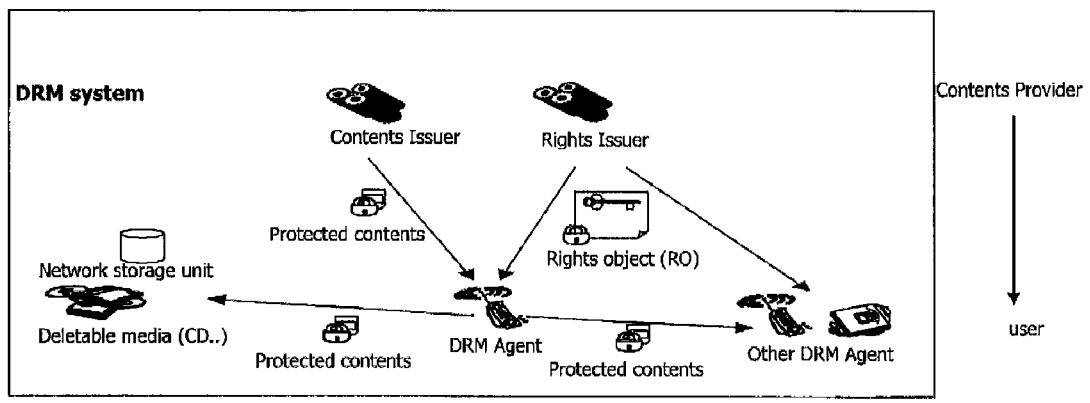
FIG. 1 is a configuration view illustrating a DRM system in accordance with the related art.

The present invention can be applied to a Digital Rights Object (DRM) system and other communication systems related to the DRM system. However, the present invention may not be limited thereto, but be applicable to other systems to which the concept of the present invention can be applied.

The present invention relates to a method for managing (e.g., leaving) a specific domain (or user domain) by a specific device after completely (fully) returning a Rights Object (RO) taken by the specific device, instead of deactivating the RO, when leaving the user domain. Here, the device which intends to leave the specific domain transfers (sends, moves, etc.) its RO to another device desiring to join the specific domain and thereafter leaves the specific domain under the control of Domain Authority/Domain Enforcement Agent (DA/DEA). Also, the present invention performs signaling related to leaving and joining the domain via a protocol (so-called Domain Management Protocol (DMP)) set between the DA/DEA and the device.

Technical terms used in the present invention will be explained as follows.

The terminal of the present invention is referred to as a device, and includes all kinds of terminals consuming digital contents. That is, the device of the present invention includes a mobile communication terminal using digital contents such as a user equipment (UE), a mobile phone, a cellular phone, a DMB phone, a DVB-H phone, a PDA, and a PTT, a digital TV, a GPS navigator, a portable game player, a MP3 player, and other home electric appliances. Accordingly, the term of 'terminal' is same as the term of 'device' in the present invention. The device of the present invention includes a communication module, a Web/WAP browser, a DRM agent, a media reproducer & library, and a memory. Particularly, the terminal (or device) in the present invention is the same as the DRM agents performing primary functions.

A domain indicates a collection of device or a group having one or more devices. The domain is an object managed by a right issuer (RI) or a domain authority (DA), and has a corresponding domain key. The domain key is a symmetric key and is used to encode and/or decode a domain RO. The domain RO Is issued by the RI, and includes permission and a constraint for DRM contents. In order for only a device having the domain key to use the DRM contents, the DRM contents are encrypted by a content encryption key included in the domain RO and the content encryption key in the domain RO is encrypted by the domain key. Therefore, only devices joining a specific domain (i.e., each DRM agent of the devices) can decrypt a contents encryption key in a domain RO by using a domain key, and can decrypt and render DRM contents by using the decrypted contents encryption key. The DRM agent is mounted on a specific device thus to join and/or leave the domain. The DRM agent also moves the domain RO to another DRM agent inside the domain through a wire/wireless media.

The RO for DRM contents is divided into a Stateful RO and a Stateless RO. The Stateless RO is an RO that a device does not manage State Information. The Stateful RO is an RO that a device manages State Information so as to precisely utilize a Permission and a Constraint inside the RO. The Constraint managed by the State Information includes 'interval', 'count', 'timed-count', 'accumulated', etc. The State Information indicates a usable amount of RO, and one State Information is managed by one Stateful RO. The State Information may be implemented in a manner of a 'count', 'timed-count', etc., or in a manner of a 'remaining count', a 'remaining interval', etc.

Hereinafter, Domain Authority/Domain Enforcement Agent (DA/DEA) is described.

The DA is an entity for defining a domain and a policy of the domain. The DEA is an entity for applying the policy to the domain, and managing the domain using the policy. Also, the DEA manages joining and leaving of the domain by devices. The domain policy may be represented as a collection of attributes determining characteristics of the membership of the domain, as set by the Domain Authority that Domain Enforcement Agent will enforce.

These functions of the DA/DEA may be performed by one module or one device, or by separate modules or devices, respectively. However, since DA/DEA is not an essential part of the present Invention, details for DA/DEA will not be fully explained below. Also, for the sake of explanation in the present invention, it is assumed that the DA and the DEA are performed by a unified module or a unified device. Also, in the present invention, it is assumed that a domain RO is a Stateful RO, but it may be a Stateless RO according to the domain policy.

Configurations and operations of embodiments of the present invention will be described with reference to the accompanying drawings.

Figure 2:
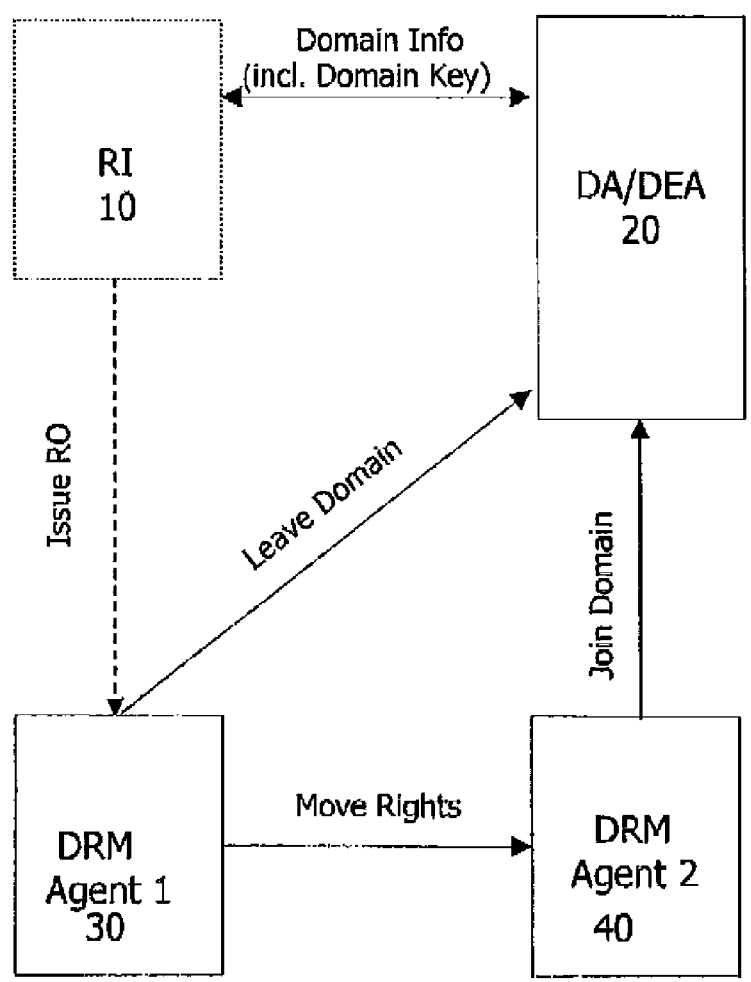
FIG. 2 is a schematic configuration view of a DRM system illustrating an exemplary method for leaving a domain by a device in accordance with one embodiment of the present invention.

FIG. 2 is a schematic configuration view of a DRM system illustrating an exemplary method for leaving a domain by a device in accordance with one embodiment of the present invention.

As illustrated in FIG. 2, a DRM system according to the present invention may include an RI 10, a DA/DEA 20 (i.e., a second device), a first DRM agent 30 (i.e., a first device), and a second DRM agent 40 (i.e., a target device). Here, as mentioned above, the DRM agents are mounted in DRM enabled terminals (devices). Therefore, the first DRM agent may be mounted in a first device, and the second DRM agent 40 in a second device. In the present invention, a DRM agent and a device may substantially be the same as each other. However, it will describe the "DRM agent" as a functional entity and the "device" as a physical entity.

Hereinafter, components in FIG. 2 will be described.

The RI 10 may send and receive domain information to/from the DA/DEA 20. Here, the domain information may include a domain key and/or domain policy. The DA/DEA 20 may manage or control joining and leaving of a device in a specific domain based upon the domain policy. For example, when the first DRM agent 30 desires to leave a domain joined by itself, the first DRM agent 30 may request the domain leave from the DA/DEA 20 (Leave Domain). Also, when the second DRM agent 40 desires to join the domain which the first DRM agent 30 has joined, the first DRM agent 30 requests the domain join from the DA/DEA 20 (Join Domain). That is, the first DRM agent 30 leaves a specific domain and the second DRM agent 40 joins the specific domain, under the management of the DA/DEA 20. Here, the DA/DEA 20 can search for specific devices (e.g., the second DRM agent) which can join the domain when the DA/DEA 20 exists in the local network. The first DRM agent 30 then moves its RO (i.e., domain RO taken by itself) to the second DRM agent 40 (Move Rights). The domain RO moved from the first DRM agent 30 to the second DRM agent 40 may be either a Stateful RO or a Stateless RO.

Figure 3:
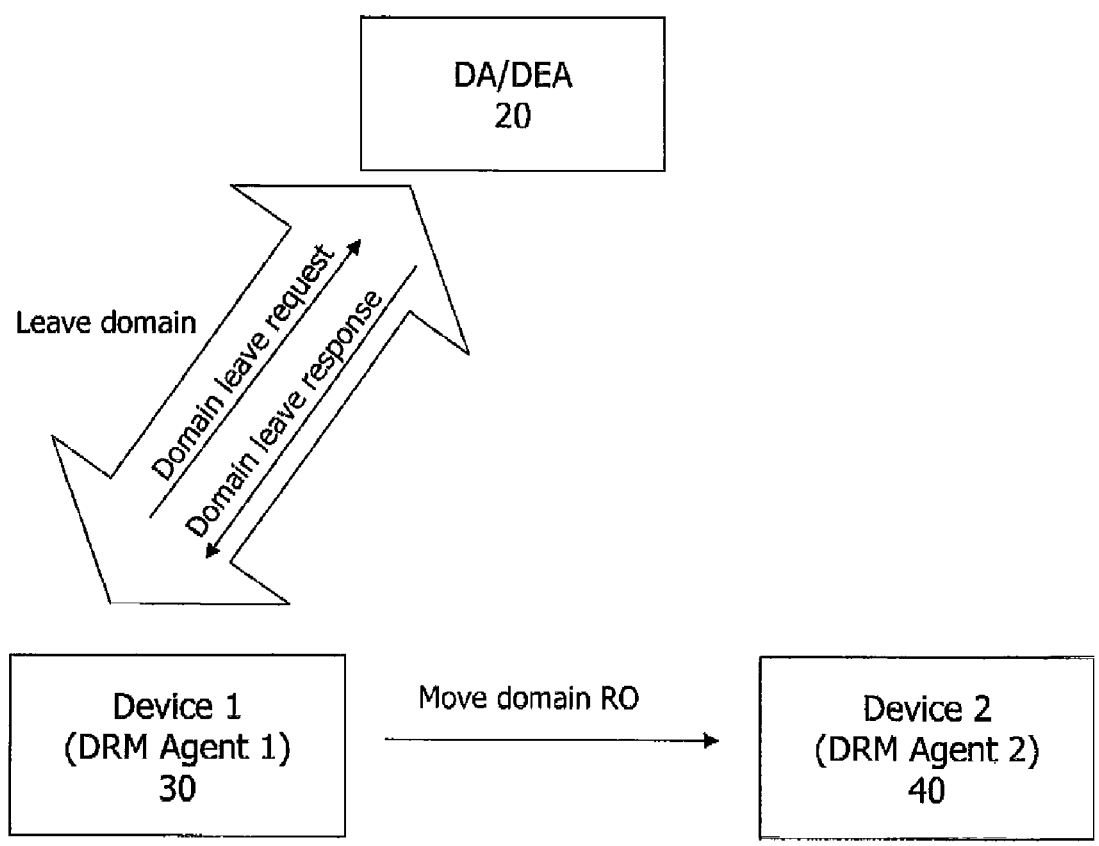
FIG. 3 is a schematic block diagram illustrating an exemplary procedure of leaving a domain by a device in accordance with a first embodiment of the present invention.

FIG. 3 is a schematic block diagram illustrating an exemplary procedure of leaving a domain by a device in accordance with a first embodiment of the present invention, particularly, illustrating a procedure of leaving a domain by a device 1. That is, the device 1 30 performs signaling related to the domain leave with the DA/DEA 20 to leave a specific domain and performs signaling for transferring (moving) a domain RO taken by itself to a device 2 40. A specific protocol may be defined for each signaling between the DA/DEA 20 and the devices.

Referring to FIG. 3, the device 1 30 sends a Domain Leave Request message to the DA/DEA 20 in order to leave a specific domain (not shown) which it has joined. Here, the Domain Leave Request message may include information related to the domain leave such as the ID Of the specific domain, the ID of the device 1 30, and the like.

The device 1 30 may send (transfers or moves) a domain RO taken by itself (i.e., an RO of digital contents usable by devices joined to the specific domain) to a target device, for example, to the device 2 40 in order to leave the specific domain (Move domain RO). Alternatively, the target device may be the DA/DEA 20 in addition to the device 2 40. As such, when the device 1 30 moves its domain RO to the target device, the DA/DEA 20 sends the device 1 30 a message (e.g., Domain Leave Response) indicating that the leaving of the device 1 30 from the domain was successful.

In the embodiment of FIG. 3, the device 1 30 sends the Domain Leave Request message to the DA/DEA 20 and receives the Domain Leave Response message from the DA/DEA 20 in response to the request message. Thereafter, the device 1 30 can move the domain RO taken by itself to the target device.

Figure 4:
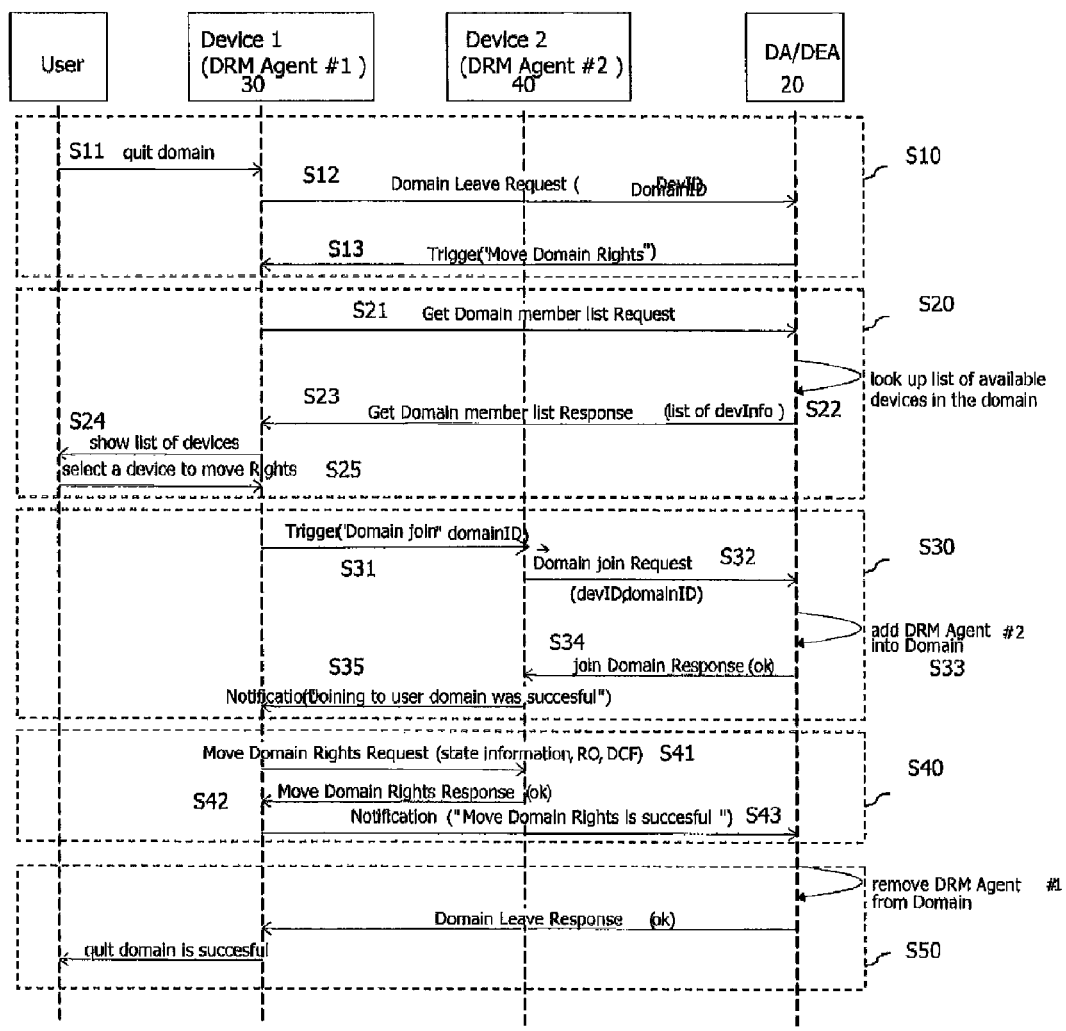
FIG. 4 is a signal flowchart illustrating an exemplary method for leaving a certain domain by a device in accordance with a second embodiment of the present invention.

FIG. 4 is a signal flowchart illustrating an exemplary method for leaving a certain domain by a device in accordance with a second embodiment of the present invention. Particularly, the embodiment of FIG. 4 illustrates the first embodiment of FIG. 3 in detail.

Description will be given with reference to FIGS. 3 and 4 hereafter.

The second embodiment of FIG. 4 may comprise a step S10 In which a first device 30 sends to the DA/DEA 20 a signal (or message) for requesting the leaving from a domain joined by itself, a series of steps S20 to S40 in which the first device 30 moves a domain RO taken by itself to a second device 40, and a step S50 in which the DA/DEA 20 sends a signal (or message) indicating a successful leaving from the domain to the first device 30. The steps S20 and S30 may optionally be performed. The first device 30 may be a device having a first DRM agent mounted therein and the second device 40 may be a device having a second DRM agent mounted therein. More detailed description of the second embodiment of FIG. 4 will be given as follows.

When the first device 30 receives from a user (i.e. a user of the first device) an input signal (i.e., quit domain) indicating that he intends to leave a specific domain (or a user domain), namely, a domain joined by the first device 30 (S11), the first device 30 sends to the DA/DEA 20 a message (e.g., Domain Leave Request) requesting for leaving from the domain joined by itself (S12). Here, the Domain Leave Request message may include the ID of the domain (i.e., DomainID) and the ID of a target device (i.e., the first device 30) (i.e., DeviceID) to be left from the domain. Alternatively, the DA/DEA 20 may transmit a trigger message (i.e., Leave Domain Trigger message) for driving the first device 30 to leave the domain. Then the first device 30 may receive the trigger message, perform interaction with a user of the first device 30, and transmit a Domain Leave Request message to the DA/DEA 20 . Here, the Domain Leave Request message includes alt least one of the ID of the domain (i.e., DomainID) and the ID of a target device (i.e., the first device 30) (i.e., DeviceID).

This step S12 may be omitted or be replaced with a specific trigger value for checking a current domain joined state. That is, the steps S11 and S12 may not be undergone but the following step S13 may be begun under the control of the DA/DEA 20.

The DA/DEA 20 may request the first device 30 to forward (move, transfer, or send) at least one or all of the domain ROs taken by the first device 30 to a device joined to the domain or to a new device desiring to join the domain by transmitting a Move Domain RO Trigger message) (S13) in response to receiving the Domain Leave Request message.

The first device 30 may receive information related to many devices previously joined to the domain from the DA/DEA 20, and then selects a target device to which the domain RO should be moved among the devices (S20). The step S20 will be described in detail as follows.

The device 30 may request the DA/DEA 20 to search for devices which can newly join the domain around a service area (e.g., a home network service area, a local communication service area or a Bluetooth service area) (S21). The DA/DEA 20 may then search for the devices which can newly join the domain and may look up a list of available devices (i.e., look up list of available devices in the domain) (S22). The step S20 in which the first device 30 requests the DA/DEA 20 to look up the available devices in the domain may be omitted in case where the list of available devices in the domain has been previously generated or a target device (i.e. a device to receive the domain RO sent by the first device) has previously be defined.

The DA/DEA 20 may send the list of devices generated at the step S22 to the first device 30 (i.e. Get Domain member list Response) (S23). The user may check the list of devices by using the first device 30 (824), and then may select a device (i.e. a target device) to which a domain RO taken by the first device 30, for example, the second device 40 is to be moved (S25).

If the second device 40 has not joined the domain, the series of steps for the second device 40's joining the domain may be performed (S30).

That is, the first device 30 may send a trigger message (i.e. Join Domain Trigger message) such that the second device 40 can join the domain (S31). Here, the trigger message may include information related to the domain (e.g., DomainID). The DomainID corresponds to the domain information in which the second device 20 is to join, and may further include other information related to the domain.

After receiving the trigger message, the second device 40 may send a Domain Join Request message to the DA/DEA 20 (S32). Here, the Domain Join Request message may include at least one of a Domain ID of the domain which the second device 40 desires to join and a Device ID of the device (i.e. the second device) to join the domain, and may further include other specific information related to the second device to join the domain.

After receiving the Domain Join Request message at the step S32, the DA/DEA 20 may add the second device 40 into the domain (i.e. add DRM Agent #2 into Domain) (S33). The DA/DEA 20 may notify the second device 40 that the second device 40 has successfully joined the domain, by transmitting a Join Domain Response (ok) message (S34). Here, the Join Domain Response may include state information indicating whether the joining of the domain is successful or not.

Then, in response to receiving the Join Domain Response message, the second device 40 may notify the first device 30 that it has successfully joined the domain (i.e., Notification ("Joining to user domain was successful") (S35). Here, when the second device 40 has previously joined the domain, the domain joining step S30 may not be performed. The series of steps S30 may be performed after the following series of steps S40 or after another series of steps S50.

After determining a target device (i.e., the second device) to move the domain RO thereto, the first device 30 may move (transfer) at least one domain RO or all of the domain ROs taken by itself to the second device 40 (S40). Hereinafter, the series of steps S40 will be described.

The first device 30 may send a message (i.e., Move Domain RO Request) for moving (transferring) the domain RO taken by itself to the second device 40 (S41). Here, the Move Domain Rights RO message may include the Device ID of the first device and part or all of the domain ROs taken by the first device 30 while the first device 30 joins the domain. Also, the Move Domain RO Request message may further include state information related to the domain RO if each domain RO is stateful, DRM protected contents, and the like. Afterwards, the second device 40 may send to the first device 30 a message informing that it has received the domain RO (i.e. Move Domain RO Response (ok) message) (S42). Here, the Move Domain RO Response message may include at least state information indicating whether the joining of the domain is successful or not.

In response to receiving the Movie Domain RO Response message, the first device 30 may notify the DA/DEA 20 that it has moved (transferred) the part or all of its domain ROs to the second device 40 (i.e. Notification ("Move Domain RO is successful") (S43).

The DA/DEA 20 may remove the first device 30 from the members of the domain (i.e. remove Device #1 from Domain), and inform the removal to the first device 30 by sending a Domain Leave Response (ok) thereto, thereby completing the procedure of leaving of the first device from the domain (S50). The Domain Leave Response message may include at least state information indicating whether the leaving of the domain is successful or not.

Figure 5:
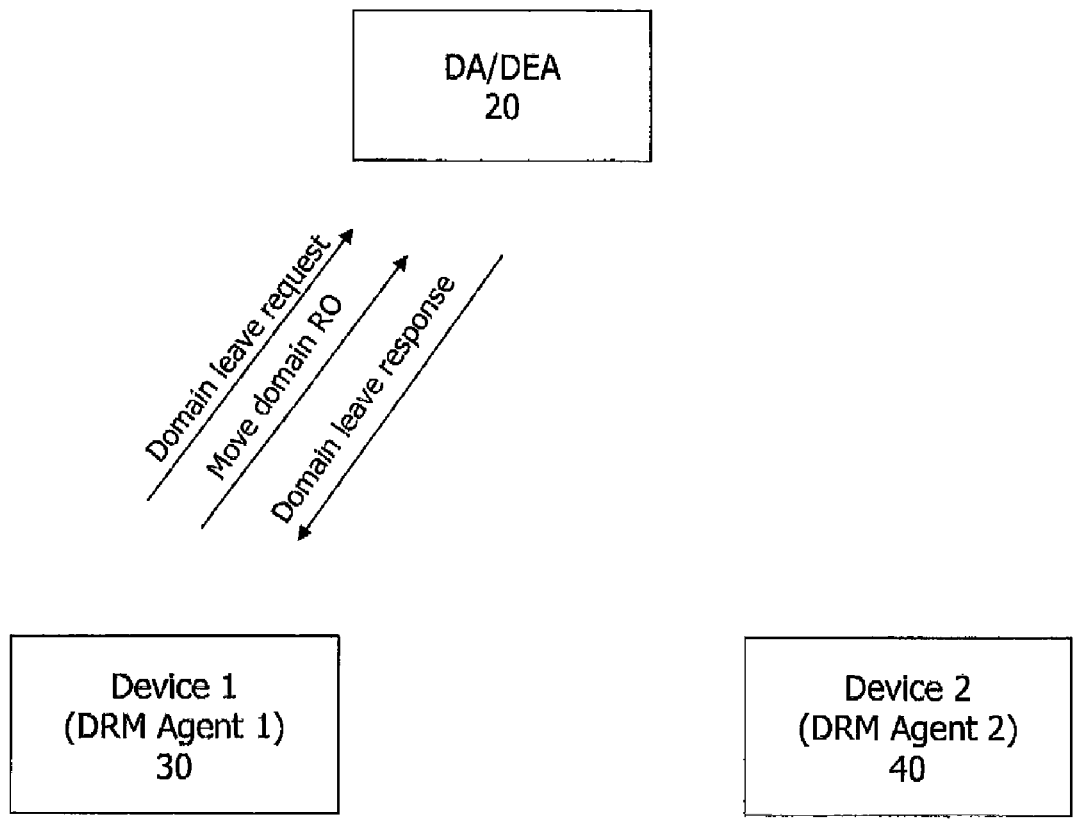
FIG. 5 is a schematic block diagram illustrating an exemplary method in which a first device moves a domain RO to a DA/DEA and leave the domain in accordance with a third embodiment of the present invention.

FIG. 5 is a schematic block diagram illustrating a method in which a first device moves a domain RO to a DA/DEA and leaves the domain in accordance with a third embodiment of the present invention. As illustrated in FIG. 5, when the first device 30 leaves the domain, instead of moving (transferring) the part or all of its domain ROs to another device, the first device 30 may move them to the DA/DEA 20 and then leave the domain. That is, the third embodiment of FIG. 5 may correspond to a case where the target device to move the part or all of the domain ROs thereto is the DA/DEA 20.

Figure 6:
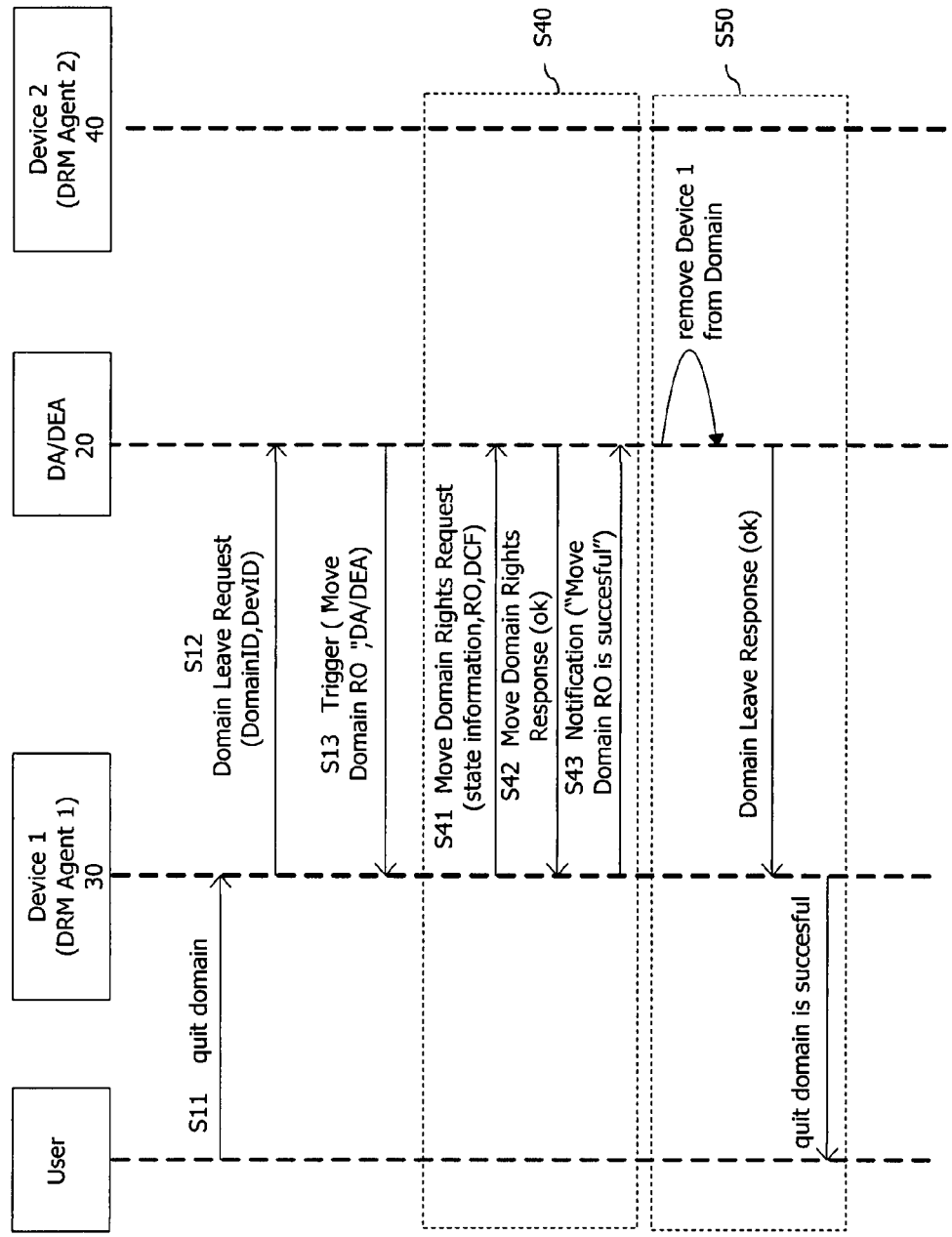
FIG. 6 is a signal flowchart illustrating the third embodiment of FIG. 5 in detail.

FIG. 6 is a signal flowchart illustrating the third embodiment of FIG. 5 in detail. However, the reference numerals shown in FIG. 6 identical to those in FIG. 4 define the same signaling and operations. Therefore, the operation corresponding to each reference numeral in FIG. 6 corresponds to the operation of the reference numeral in FIG. 4. Accordingly, the description of each operation in the second embodiment of FIG. 4 may be applied to each operation in the second embodiment of FIG. 6.

Hereinafter, description will be given with reference to FIGS. 5 and 6.

When the first device 30 (i.e., a device having a first DRM agent mounted therein) receives an input signal (i.e., quit domain) from a user to be informed that he desires to leave a specific domain (or user domain), namely, the domain joined by the first device 30 (S11), the first device 30 may send a message (i.e. Domain Leave Request) requesting for its leaving from the domain to the DA/DEA 20 (S12). Here, the message may include at least one of a Domain ID and a Device ID of a sending side device (i.e., the first device) to be left from the domain. Alternatively, the DA/DEA 20 may transmit a trigger message (i.e., Leave Domain Trigger message) for driving the first device 30 to leave the domain. Then the first device 30 may receive the trigger message, perform interaction with a user of the first device 30, and transmit a Domain Leave Request message to the DA/DEA 20. Here, the Domain Leave Request message includes alt least one of the ID of the domain (i.e., DomainID) and the ID of a target device (i.e., the first device 30) (i.e., DeviceID).

In response to receiving the Domain Leave Request message, the DA/DEA 20 may request the first device 30, which desires to leave the domain, to move (transfer) part or all of domain ROs taken by itself to a target device by transmitting a Move Domain RO Trigger message (S13). Here, the target device may include the DA/DEA 20 as well as a device previously joined to the domain or to a new device desiring to join the domain.

The first device 30 may select the DA/DEA 20 as the target device and perform a signaling of moving its domain RO(s) to the DA/DEA 20 (S40). That is, the first device 30 may send to the DA/DEA 20 a Move Domain RO Request message indicating that it moves part or all of the domain ROs taken by itself to the DA/DEA 20 (S41). Here, the Move Domain RO Request message may include at least one of the Device ID of the first device, and the part or all of the domain ROs. The Move Domain RO Request message may further include state information related to the ROs, if the domain RO is stateful, The Move Domain RO Request message may further include DRM protected contents, and the like.

Afterwards, the DA/DEA 20 may send a Move Domain RO Response (ok) message indicating the successful reception of the domain RO to the first device 30 (S42). Here, the Move Domain RO Response message may include state information indicating whether the moving of the domain RO is successful or not.

In response to receiving the Move Domain RO Response message, the first device 30 may notify the DA/DEA 20 that it has successfully moved the part or all of the domain ROs taken by itself by transmitting a Notification message ("Move Domain RO is successful") (S43).

In response to receiving the Notification message, the DA/DEA 20 may remove the first device 30 from the members of the domain (i.e. remove Device 1 from Domain), and informs the first device 30 of the removal by transmitting a Domain Leave Response (ok) message, thereby completing the procedure of leaving the domain by the first device 30. Here, the Domain Leave Response message may include state information indicating whether the leaving of the domain is successful or not.

Afterwards, the DA/DEA 20 may move the domain ROs to another device joined to the domain by receiving a control signal from the exterior. Here, the another device may be either the first device 30 which has left the domain or be other devices intending to join the domain or previously joined therein. The moving of the domain ROs from the DA/DEA to the another device can be understood by the description of the first embodiment of the present invention and the description disclosed in the related art, explanation of which will thusly be omitted.

Figure 7:
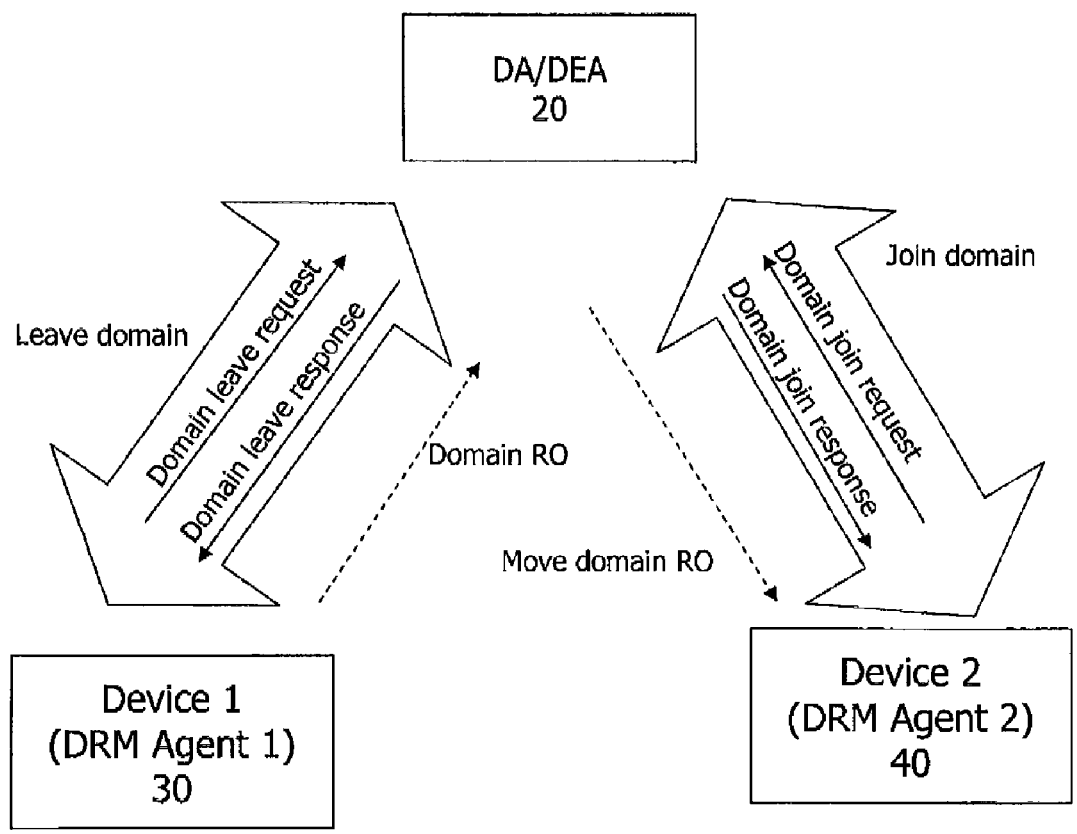
FIG. 7 is a schematic block diagram illustrating an exemplary method in which a certain device leaves a domain and another device joins the domain in accordance with a fourth embodiment of the present invention.

FIG. 7 is a schematic block diagram illustrating an exemplary method in which a certain device leaves a domain and another device joins the domain in accordance with a fourth embodiment of the present invention.

As illustrated in FIG. 7, the first device 30 may sends a Domain Leave Request message to the DA/DEA 20 to request the leaving from the domain joined by the first device 30 itself Alternatively, when the DA/DEA 20 sends a trigger message (I.e., Leave Domain Trigger message) to the first device 30 to leave the domain, the first device 30 having received the trigger message may interact with a user of the first device 30 and then send the Domain Leave Request message to the DA/DEA 20. Here, the Domain Leave Request message may include at least one of a Domian ID, a Device ID of the first device 30, and domain RO. In response to receiving the Domain Leave Request message, the DA/DEA 20 may remove the first device 30 from the members of the domain, and send to the first device 30 a Domain Leave Response message indicating the successful leaving from the domain. Here, the Domain Leave Response message may include a state code indicating whether the leaving from the domain is successful or not. The second device 40 thereafter may join the domain managed by the DA/DEA 20 and receives the domain ROs so as to consume corresponding digital contents. The signaling between DA/DEA 20 and the second device 40 performed by the second device 40 to join the domain may be implemented by applying the series of steps S40, for example. When the DA/DEA 20 sends a trigger message (i.e., Join Domain Trigger) to the second device 40 to join the domain, the second device 40 may send a Domain Join Request message to the DA/DEA 20. Here, the Domain Join Request message may include information such as device ID of the second device, domain ID of the domain and the like. In response to the Domain Join Request message, the DA/DEA 20 may allow the second device 40 to join the domain and send to the second device 40 a Domain Join Response message indicating the successful joining to the domain. Here, the Domain Join Response message may include at least one of a state code indicating whether the joining of the domain is successful or not, domain RO. If the domain RO is stateful, the Domain Join, the Domain Join Response message may further include state information related to the RO. The Domain Join Response message may further include DRM protected contents, and the like.

Hereinafter, a terminal (device) according to the present invention will be described.

A terminal according to the present invention may include basic hardware and software to perform signaling necessary to leave and join a specific domain. Also, the terminal according to the present invention may internally include a communication module, a Web/WAP browser, a DRM agent, a media reproducer and library and a memory.

That is, the terminal according to the present invention may comprise: a transmitter which sends to a DA/DEA a message requesting for leaving from a domain; a receiver which receives a trigger message for moving domain ROs from the DA/DEA, receives a message indicating a domain leave and receives information related to a target device provided by the DA/DEA; and a controller which selects the target device to move domain ROs thereto based upon the received information related to the target device, and moves the domain ROs to the target device. The controller may be a DRM agent. The terminal according to the present invention may further comprise: a memory which stores the received information related to the target device; an output unit (e.g., a display) which displays the information, and an input unit (e.g., a keypad) which selects a specific target device from a list of target devices displayed on the output unit. In addition to this, the terminal according to the present invention may construct basic hardware and software capable of using DRM contents, which can be obvious to those skilled in the art. Detailed explanation thereof will be omitted accordingly.

As described above, the present invention has been explained with reference to the embodiments which are merely exemplary. It will be apparent to those skilled in the art that various modifications and variations can be made in the present invention without departing from the spirit or scope of the invention. For example, in the previously mentioned embodiments, the DA/DEA 20 may be implemented as one module or separate modules, namely, as DA and DEA to thusly be connected to the RI. Alternatively, the DA/DEA 20 may separately be configured from the RI or configured in available combination therewith, so as to implement the embodiments of the present invention. Signaling between the DA/DEA 20 and the device may be performed based upon a protocol in a request/response structure for the domain join and a domain leave. Part or all of domain ROs can be moved via the protocol. Thus, it is intended that the present invention cover modifications and variations of this invention provided they come within the scope of the appended claims and their equivalents.

The invention claimed is:

1. A method for leaving a specific domain after returning a domain Rights Object (RO) taken by a specific device in a Digital Rights Management (DRM) comprising:

sending, by a first device, to a second device, a first message, the first message requesting for leaving from a specific domain, wherein the domain is managed by the second device and the second device is a domain authority/domain enforcement agent (DA/DEA);

receiving, by the first device, from the second device, information related to a device or devices to which a domain RO is to be moved, wherein the information includes a list of available devices or a target device to which the domain RO is to be moved, and the information is received by the first device after the first device requests for leaving from the specific domain;

moving, by the first device, the domain RO to the target device based upon the received information in order for the first device to leave from the specific domain;

receiving, by the first device, from the target device, a response message in response to the request message, the response message informing the first device that the target device has successfully received the domain RO;

sending, by the first device, to the second device, a notification message for notifying that the first device has moved the domain RO to the target device; and receiving, by the first device, from the second device, a second message indicating the leaving from the specific domain after removing, by the second device, the first device from the specific domain.

2. The method of claim 1, wherein the target device is at least one device among the list of available devices to which the domain RO is to be moved.

3. The method of claim 1, further comprising:

sending, by the first device, to the target device, a trigger message to request that the target device join the domain if the target device has not already joined the domain; and receiving, by the first device, from the target device, a notification message of joining the domain when the second device joins the domain successfully.

4. The method of claim 1, further comprising:

sending, by the first device, to the second device, a message to request the information related to the target device or a list of available devices to which a domain RO is to be moved.

5. The method of claim 1, further comprising:

sending, by the first device, to the target device, state information related to the domain RO and digital protected contents.

6. The method of claim 1, wherein the information related to the target device is a list of devices joined to the domain, the domain managed by the second device, or comprises a list of devices desiring to join the domain.

7. The method of claim 1, wherein the domain RO is an RO used in a specific domain.

* * * * *